US012795726B2

(12) United States Patent
Balakrishnan et al.

(10) Patent No.: US 12,795,726 B2
(45) Date of Patent: Nov. 10, 2026

(54) MULTI-AP TRANSMISSION WITH INTERFERENCE ALIGNMENT

(71) Applicant: NXP USA, Inc., Austin, TX (US)

(72) Inventors: Hari Ram Balakrishnan, Chennai (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 362 days.

(21) Appl. No.: 18/417,459

(22) Filed: Jan. 19, 2024

(65) Prior Publication Data

US 2024/0251442 A1 Jul. 25, 2024

(30) Foreign Application Priority Data

Jan. 20, 2023 (IN) ............................ 202321004107

(51) Int. Cl.

| | |
|---|---|
| ***H04W 74/0816*** | (2024.01) |
| ***H04L 5/00*** | (2006.01) |
| ***H04L 25/02*** | (2006.01) |
| ***H04W 16/28*** | (2009.01) |

(52) U.S. Cl.
CPC ....... *H04W 74/0816* (2013.01); *H04L 5/0053* (2013.01); *H04L 25/0204* (2013.01); *H04W 16/28* (2013.01)

(58) Field of Classification Search
CPC .............. H04W 74/0816; H04W 16/28; H04L 5/0053; H04L 25/0204
See application file for complete search history.

(56) References Cited

U.S. PATENT DOCUMENTS

| | | | | |
|---|---|---|---|---|
| 8,462,873 | B2 | 6/2013 | Park et al. | |
| 9,838,090 | B2 | 12/2017 | Lee et al. | |
| 11,405,075 | B2 | 8/2022 | Balakrishnan et al. | |
| 2019/0379434 | A1* | 12/2019 | Lindskog | G01P 13/04 |
| 2021/0152396 | A1* | 5/2021 | Cherian | H04B 7/0452 |
| 2021/0410149 | A1* | 12/2021 | Xia | H04L 1/1887 |
| 2023/0262805 | A1* | 8/2023 | Kneckt | H04W 76/15 370/329 |
| 2023/0361815 | A1* | 11/2023 | Tsodik | H04B 7/024 |
| 2024/0283613 | A1* | 8/2024 | Huang | H04L 5/0023 |

FOREIGN PATENT DOCUMENTS

| | | | | | |
|---|---|---|---|---|---|
| CN | 112640514 | A | * | 4/2021 | H04W 84/12 |
| CN | 113395701 | A | * | 9/2021 | H04W 74/085 |
| KR | 20150082558 | A | * | 7/2015 | H04W 72/21 |
| WO | WO-2014066785 | A1 | * | 5/2014 | H04B 7/061 |

* cited by examiner

*Primary Examiner* — Saad A. Waqas

(57) ABSTRACT

Embodiments of a method and apparatus for wireless communications are disclosed. In an embodiment, a wireless device includes a controller configured to generate a trigger packet indicating that wireless access points (APs) can join coordinated transmission with the wireless device and a wireless transceiver configured to transmit the trigger packet to the wireless APs.

18 Claims, 8 Drawing Sheets

600

| M | N | $\sum_{j=1}^{3} Nss_j$ | $(Nss_1, Nss_2, Nss_3)$ | PRECODER |
|---|---|---|---|---|
| 2 | 2 | 3 | (1,1,1) | $Q_1$ = EIGEN VECTOR$(V_{31}^{-1}V_{32}\ V_{12}^{-1}V_{13}\ V_{23}^{-1}V_{21})$<br>$Q_2 = V_{32}^{-1}V_{31}Q_1, Q_3 = V_{23}^{-1}V_{21}Q_1$ |
| 4 | 2 | 4 | (2,1,1) - ANY USER WITH 2 STREAM | $Q_1 = [q_{11}, q_{12}], q_{11} = \mathrm{Null}(V_{21}), q_{12} = \mathrm{Null}(V_{31})$<br>$Q_2 = V_{32}^{-1}V_{31}q_{11}, Q_3 = V_{23}^{-1}V_{21}q_{12}$ |
| 4 | 4 | 6 | (2,2,2) | $Q_1$ = EIGEN VECTOR$(V_{31}^{-1}V_{32}\ V_{12}^{-1}V_{13}\ V_{23}^{-1}V_{21})$<br>$Q_2 = V_{32}^{-1}V_{31}Q_1, Q_3 = V_{23}^{-1}V_{21}Q_1$ |
| 8 | 2 | 6 | (2,2,2) - CBF SOLUTION | $Q_1 = \mathrm{Null}([V_{21}, V_{31}])$, SIMILAR FOR $Q_2$ & $Q_3$ |
| 8 | 4 | 8 | (4,4,0) | CBF SOLUTION |
| 8 | 8 | 12 | (4,4,4) | $Q_1$ = EIGEN VECTOR$(V_{31}^{-1}V_{32}\ V_{12}^{-1}V_{13}\ V_{23}^{-1}V_{21})$<br>$Q_2 = V_{32}^{-1}V_{31}Q_1, Q_3 = V_{23}^{-1}V_{21}\ Q_1$ |

FIG. 6

MULTI-AP TRANSMISSION WITH INTERFERENCE ALIGNMENT

CROSS-REFERENCE TO RELATED APPLICATIONS

This application claims priority to Indian Provisional Patent Application Serial Number 202321004107, filed on Jan. 20, 2023, the contents of which are incorporated by reference herein.

BACKGROUND

Future wireless fidelity (Wi-fi) standards (such as Wi-fi 8) may include multiple access point (multi-AP) transmission, wherein multiple APs coordinate to, for example, simultaneously transmit to one or more stations. One main mode planned for the multi-AP transmission may be joint transmission (JTx). Another main mode planned for the multi-AP transmission may be coordinated beamforming (CBF) and coordinated orthogonal frequency-division multiple access (COFDMA). In JTx, peak throughput improvement can be achieved in a dense environment, with effective utilization of the channel. JTx typically requires tight synchronization and frequent sounding and backhaul link throughput can be high. In such a scenario, peak throughput is achieved at high complexity. In CBF, effective utilization of the channel may not result in peak throughput. Synchronization requirement is lesser in CBF and the backhaul link can be defined and needs to share the feedback report or the precoder report. Further, the sounding requirement is less. Effective channel utilization at moderate complexity may be achieved. When more than two APs are coordinating, JTx requires even more complexity and in CBF gain is reduced. In CBF and COFDMA scenarios, the available resources are shared, and the benefit is available from the effective utilization of the spectrum. Although the peak throughput can be increased using JTx, the complexity of JTx is high. Therefore, there is a need for a multi-AP transmission technology that can achieve more gain than CBF with moderate/marginal increase in complexity.

SUMMARY

Embodiments of a method and apparatus for wireless communications are disclosed. In an embodiment, a wireless device includes a controller configured to generate a trigger packet indicating that wireless access points (APs) can join coordinated transmission with the wireless device and a wireless transceiver configured to transmit the trigger packet to the wireless APs. Other embodiments are also described.

In an embodiment, the wireless device includes a wireless AP.

In an embodiment, the wireless transceiver is further configured to receive a response from the wireless APs, and the controller is further configured to generate a control packet to indicate a mode of transmission based on the response from the wireless APs to the trigger packet.

In an embodiment, the trigger packet includes a trigger physical layer protocol data unit (PPDU).

In an embodiment, the response from the wireless APs includes a clear-to-send (CTS) packet.

In an embodiment, the wireless transceiver is further configured to receive a CTS packet from one of the wireless APs, and the controller is further configured to generate a control packet to indicate a Joint transmission (JTx) mode or a Co-ordinated Beamforming (CBF) mode based on the CTS packet.

In an embodiment, the wireless transceiver is further configured to receive a CTS packet from each of the wireless APs, and the controller is further configured to generate a control packet to indicate a JTx mode, a CBF mode, or a MAP-IA mode based on the CTS packets.

In an embodiment, a receiver address (RA) field and a transmitter address (TA) field of null data packet announcement (NDPA) frames are repurposed to carry a broadcast address of a MAP sounding procedure set of the wireless APs.

In an embodiment, NDPA frames and null data packets are transmitted simultaneously by the wireless device and the wireless APs to obtain channel estimation feedback reports from stations (STAs).

In an embodiment, the controller is further configured to compute a precoding vector based on the channel estimation feedback reports.

In an embodiment, the wireless transceiver is further configured to transmit Long training fields (LTFs), and a number of the LTFs is a function of a total number of streams across the wireless device and the wireless APs.

In an embodiment, a set of tones used for pilot tones are orthogonal across the wireless APs.

In an embodiment, at least one pilot is equalized at the STAs, and only one wireless AP of the wireless APs loads the pilot tones on its set of pilot tones while other wireless APs of the wireless APs do not load those set of pilot tones.

In an embodiment, the wireless transceiver is further configured to transmit an acknowledgement packet as a multi-stream channel packet.

In an embodiment, the wireless transceiver is further configured to repeat single stream data in multi-stream transmission.

In an embodiment, the acknowledgement packet is precoded with a Hermitian of a calibrated adjusted equalizer matrix computed in a previously received packet.

In an embodiment, the wireless transceiver is further configured to, on receiving the acknowledgement packet, compute the calibrated adjusted equalizer matrix and use the Hermitian of the calibrated adjusted equalizer matrix as a precoder for subsequent transmission.

In an embodiment, no response is received at the wireless transceiver from the wireless APs, and the controller is further configured to continue to operate the wireless device under a regular operational mode.

In an embodiment, a wireless AP compatible with an Institute of Electrical and Electronics Engineers (IEEE) 802.11 protocol includes a controller configured to generate a trigger packet indicating that wireless APs can join coordinated transmission with the wireless AP and a wireless transceiver configured to transmit the trigger packet to the wireless APs and to receive a response from the wireless APs. The controller is further configured to generate a control packet to indicate a mode of transmission based on the response from the wireless APs to the trigger packet.

In an embodiment, a method for wireless communications involves at a wireless device, generating a trigger packet indicating that wireless APs can join coordinated transmission with the wireless device and from the wireless device, transmitting the trigger packet to the wireless APs.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6 illustrates a tabular representation of precoder (e.g., precoding vector) computation in accordance with an embodiment of the invention.

Throughout the description, similar reference numbers may be used to identify similar elements.

DETAILED DESCRIPTION

Figure 1:
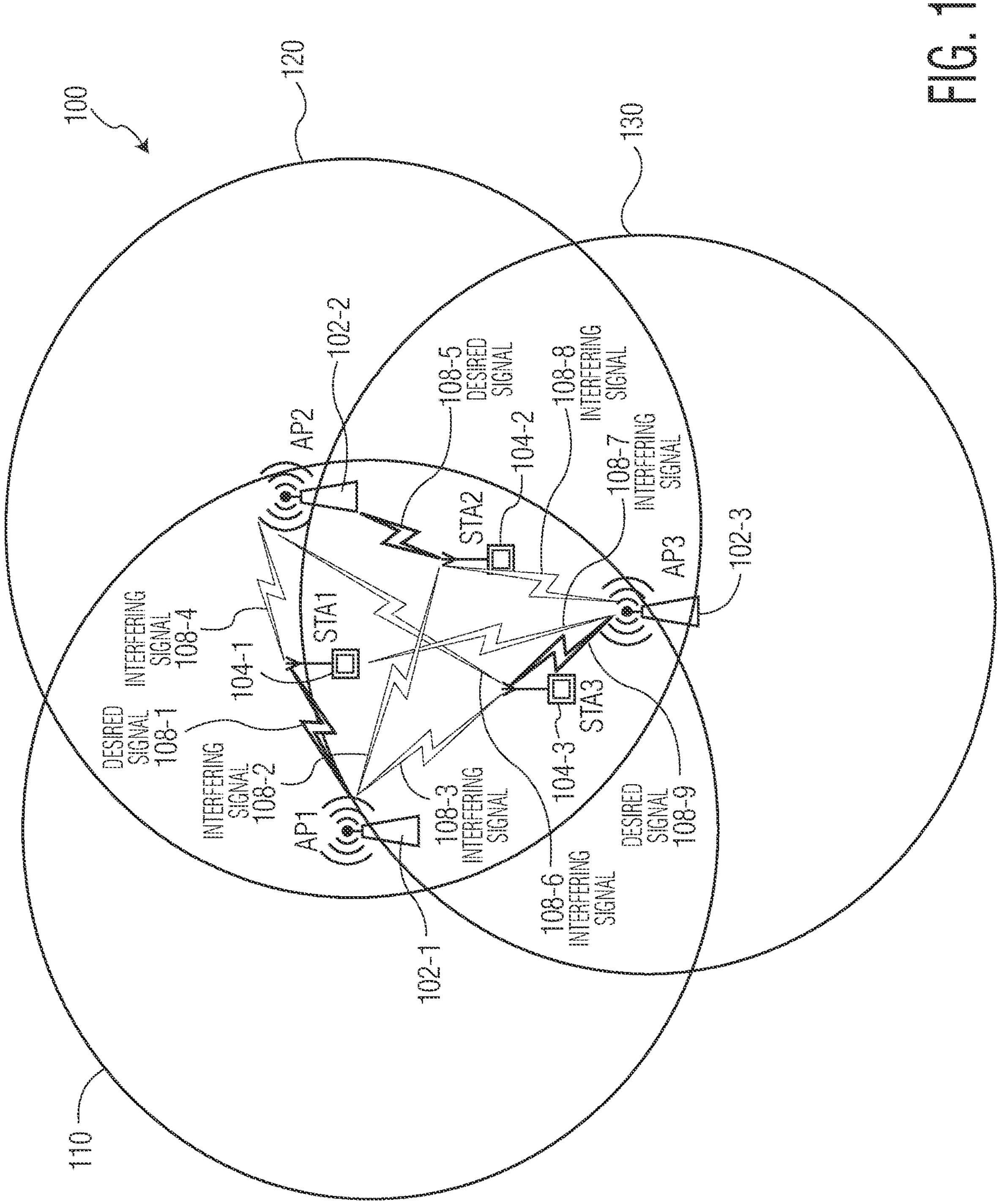
FIG. 1 depicts a multi-AP (MAP) transmission system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The present disclosure discloses a protocol definition for supporting multi-AP (MAP) transmission with interference alignment (MAP-IA). Further, the disclosure discloses the design for a MAP-IA precoder. Additionally, the disclosure discloses methods for feedback reduction in the MAP-IA and CBF scenarios.

In embodiments of a wireless communications system, a wireless device, e.g., an access point (AP) of a wireless local area network (WLAN) may transmit data to at least one associated station (STA) or vice versa. The AP may be configured to operate with associated STAs according to a communication protocol. For example, the communication protocol may be an Institute of Electrical and Electronics Engineer (IEEE) 802.11 communication protocol.

FIG. 1 depicts a multi-AP (MAP) transmission system 100 in accordance with an embodiment of the invention. In the embodiment depicted in FIG. 1, the MAP transmission system 100 includes three APs 102-1, 102-2, 102-3 and three stations (STAs) 104-1, 104-2, 104-3. The MAP transmission system 100 can be used in various applications, such as industrial applications, medical applications, computer applications, and/or consumer or enterprise applications. In some embodiments, the MAP transmission system is compatible with an IEEE 802.11 protocol. Although the depicted MAP transmission system 100 is shown in FIG. 1 with certain components and described with certain functionality herein, other embodiments of the MAP transmission system may include fewer or more components to implement the same, less, or more functionality. For example, in some embodiments, the MAP transmission system includes more than three APs, less than three APs, more than three STAs, and/or less than three STAs. In another example, although the MAP transmission system is shown in FIG. 1 as being connected in a certain topology, the network topology of the MAP transmission system is not limited to the topology shown in FIG. 1. In some embodiments, the MAP transmission system described with reference to FIG. 1 involves single-link communications and the APs 102-1, 102-2, 102-3 and the STAs 104-1, 104-2, 104-3 communicate through single communications links. In some embodiments, the MAP transmission system described with reference to FIG. 1 involves multi-link communications and the APs 102-1, 102-2, 102-3 and the STAs 104-1, 104-2, 104-3 communicate through multiple communications links. Furthermore, the techniques described herein may also be applicable to each link of a multi-link communications system.

In the embodiment depicted in FIG. 1, each of the APs 102-1, 102-2, 102-3 may be implemented in hardware (e.g., circuits), software, firmware, or a combination thereof. Each of the APs 102-1, 102-2, 102-3 may be fully or partially implemented as an integrated circuit (IC) device. In some embodiments, at least one of the APs 102-1, 102-2, 102-3 is a wireless AP compatible with at least one WLAN communications protocol (e.g., at least one IEEE 802.11 protocol). In some embodiments, at least one of the APs 102-1, 102-2, 102-3 is a wireless AP that connects to a local area network (LAN) and/or to a backbone network (e.g., the Internet) through a wired connection and that wirelessly connects to one or more wireless STAs, for example, through one or more WLAN communications protocols, such as an IEEE 802.11 protocol. In some embodiments, at least one of the APs 102-1, 102-2, 102-3 includes at least one antenna, at least one transceiver operably coupled to the at least one antenna, and at least one controller operably coupled to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, at least one of the APs 102-1, 102-2, 102-3 (e.g., a controller or a transceiver of the AP) implements upper layer Media Access Control (MAC) functionalities (e.g., beacon acknowledgement establishment, reordering of frames, etc.) and/or lower layer MAC functionalities (e.g., backoff, frame transmission, frame reception, etc.). Although the MAP transmission system 100 is shown in FIG. 1 as including three APs, other embodiments of the MAP transmission system 100 may include more than three APs or less than three APs. In some embodiments, each of the APs 102-1, 102-2, 102-3 of the MAP transmission system 100 may operate in a different frequency band. For example, one AP may operate in one frequency band of 2.4 Gigahertz (GHz), 5 GHZ, 6 GHz, 45 GHZ, and 60 GHz frequency bands and another AP may operate in another frequency band of 2.4 GHz, 5 GHZ, 6 GHZ, 45 GHZ, and 60 GHz frequency bands.

In the embodiment depicted in FIG. 1, the STAs 104-1, 104-2, 104-3 may be implemented in hardware (e.g., circuits), software, firmware, or a combination thereof. Each of the STAs 104-1, 104-2, 104-3 may be fully or partially implemented as IC devices. In some embodiments, at least one of the STAs 104-1, 104-2, 104-3 is a communications device compatible with at least one IEEE 802.11 protocol. In some embodiments, at least one of the STAs 104-1, 104-2, 104-3 is implemented in a laptop, a desktop personal computer (PC), a mobile phone, or other communications device that supports at least one WLAN communications protocol. In some embodiments, at least one of the STAs 104-1, 104-2, 104-3 implements a common MAC data service interface and a lower layer MAC data service interface. In some embodiments, at least one of the STAs 104-1, 104-2, 104-3 includes at least one antenna, at least one transceiver operably coupled to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver. Although the MAP transmission system 100 is shown in FIG. 1 as including three STAs, other embodiments of the MAP transmission system 100 may include more than three STAs or less than three STAs.

In the embodiment depicted in FIG. 1, the APs 102-1, 102-2, 102-3 communicate with the STAs 104-1, 104-2, 104-3 via communications links (e.g., wireless links) 108-1, . . . , 108-9. In some embodiments, data communicated between the APs and the STAs includes MAC protocol data units (MPDUs). An MPDU may include a frame header, a frame body, and a trailer with the MPDU payload encapsulated in the frame body. In some embodiments, the APs 102-1, 102-2, 102-3 may collaborate to communicate independently with the STAs 104-1, 104-2, 104-3. In some embodiments, the number of antennas at each device is two. In the embodiment depicted in FIG. 1, a circle 110 represents the wireless communications range of the wireless AP 102-1, a circle 120 represents the wireless communications range of the wireless AP 102-2, and a circle 130 represents the wireless communications range of the wireless AP 102-3. In some embodiment, at the STA 104-1, interference signals are received through the communications links 108-4, 108-7 and a desired signal (DS) is received through the communications link 108-1. In some embodiment, at the STA 104-2, interference signals are received through the communications links 108-2, 108-8 and a desired signal is received through the communications link 108-5. In some embodiment, at the STA 104-3, interference signals are received through the communications links 108-3, 108-6 and a desired signal is received through the communications link 108-9.

Figure 2:
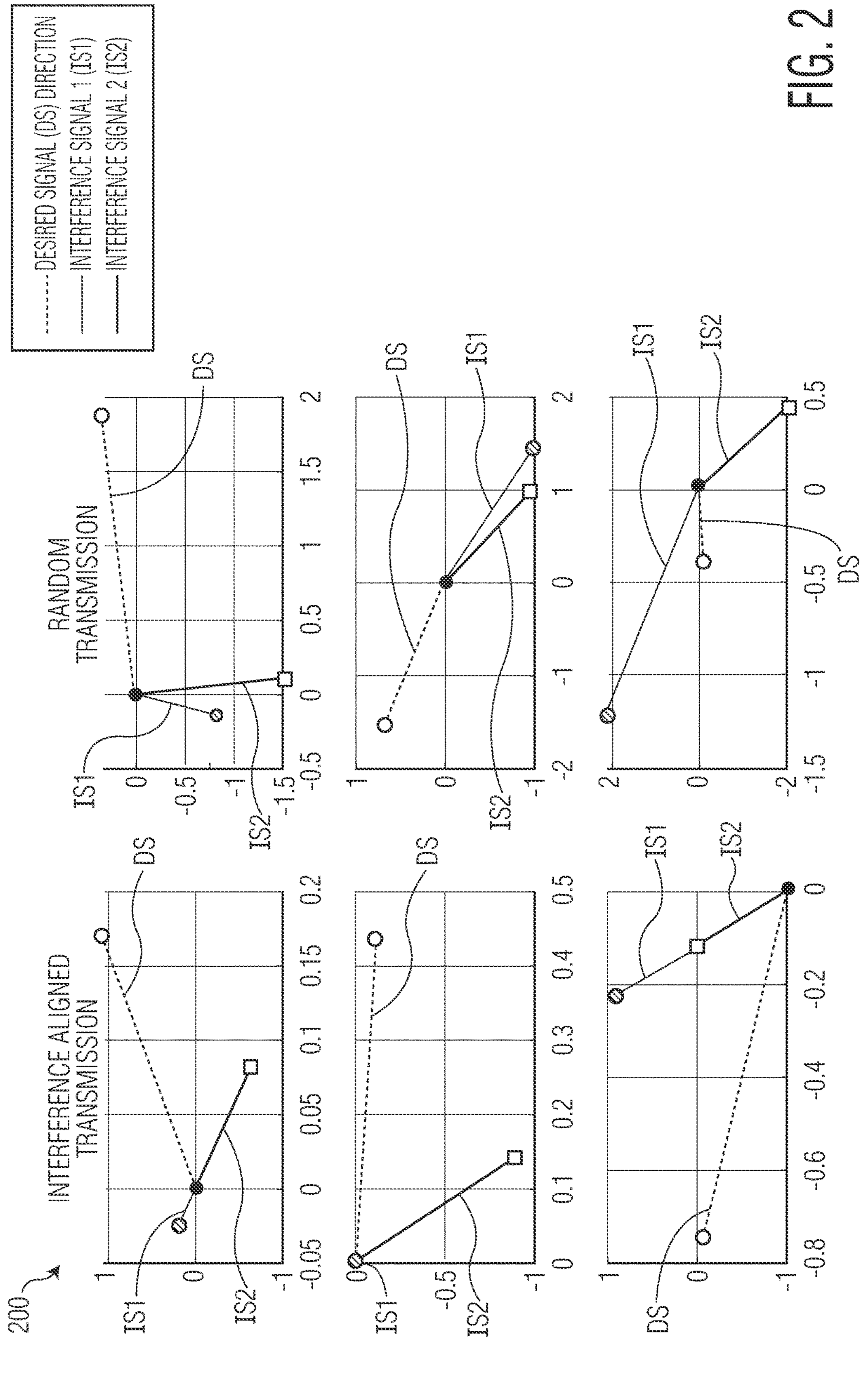
FIG. 2 illustrates an example graphical representation of the directions of interference signals and a desired signal.

FIG. 2 illustrates an example graphical representation 200 of the directions of interference signals and a desired signal. The graphical representation 200 may illustrate multiple transmitters collaborating to communicate independently with multiple receivers. For example, the graphical representation 200 illustrated in FIG. 2 is representative of the MAP transmission system 100 with the APs 102-1, 102-2, 102-3 and the STAs 104-1, 104-2, 104-3 depicted in FIG. 1.

In FIG. 2, the directions of a first interference signal (IS1), a second interference signal (IS2), and a desired signal (DS) are shown. In the interference alignment (IA) transmission case, the IS1 and IS2 are aligned in a single direction while in the random transmission case, IS1 and IS2 are not in a single direction.

For random precoding transmission or the nulling transmission, a degree of freedom (DoF) available for each transmitter and receiver pair may be two or three. Further, each transmitter-receiver (e.g., AP-STA) pair may operate based on three time slots. Each transmitter-receiver (e.g., AP-STA) pair may occupy a single time slot and transmit two streams of data. Across three time slots, each transmitter-receiver (e.g., AP-STA) pair may occupy one time slot and transmit two streams of data. For interference alignment (IA), each of the transmitter-receiver (e.g., AP-STA) pairs may transmit a single stream per time slot such that the DoF associated with the transmitter-receiver (e.g., AP-STA) pair is one. Therefore, the interference alignment along with the coordinated beamforming (CBF) may result in a significant increase in throughput for each transmitter-receiver (e.g., AP-STA) pair. In an example, the increase in throughput is 50%.

During the regular precoding operation such as beamforming or nulling transmission, in a given time slot, if all three transmitters (e.g., the APs 102-1, 102-2, 102-3) are transmitting signals, the IS1 and IS2 may occupy 2-dimensions available at a receiver (e.g., one of the STAs 104-1, 104-2, 104-3). Therefore, the DS may always have interference. To eliminate interference, CBF with nulling transmission is implemented with two pairs of transmitters in a slot. Each transmitter-receiver (e.g., AP-STA) pair may be implemented in a single stream. Alternatively, or additionally, a single transmitter may be configured to transmit two streams in a given slot. Further, each transmitter-receiver (e.g., AP-STA) pair may be associated with three-time slots, and may be configured to transmit signals in two streams.

In some embodiments, IA precoders (e.g., precoding vectors) are designed such that at each receiver, the interfering signal may occupy a single dimension. Therefore, two interference signals are equivalent to one interfering signal received. Further, the receiving (Rx) antenna may be configured to eliminate the interference and decode the desired signal.

In some embodiments, an IA precoder computation block requires the channel estimate of all the 9-links (e.g., the communication links (e.g., wireless links) 108-1, . . . , 108-9). Further, time and frequency synchronization information is required. Other than precoder (e.g., precoding vector) computation, no other information is required to be exchanged across the transmitters (e.g., the APs 102-1, 102-2, 102-3). Further, coordination and transmitter selection are required.

Although a case with 3-user and 2 antenna cases is explained, the scope of the present disclosure is not limited to it. In general, the idea can be extended to the K-user case with an arbitrary number of antennas.

Figure 3:
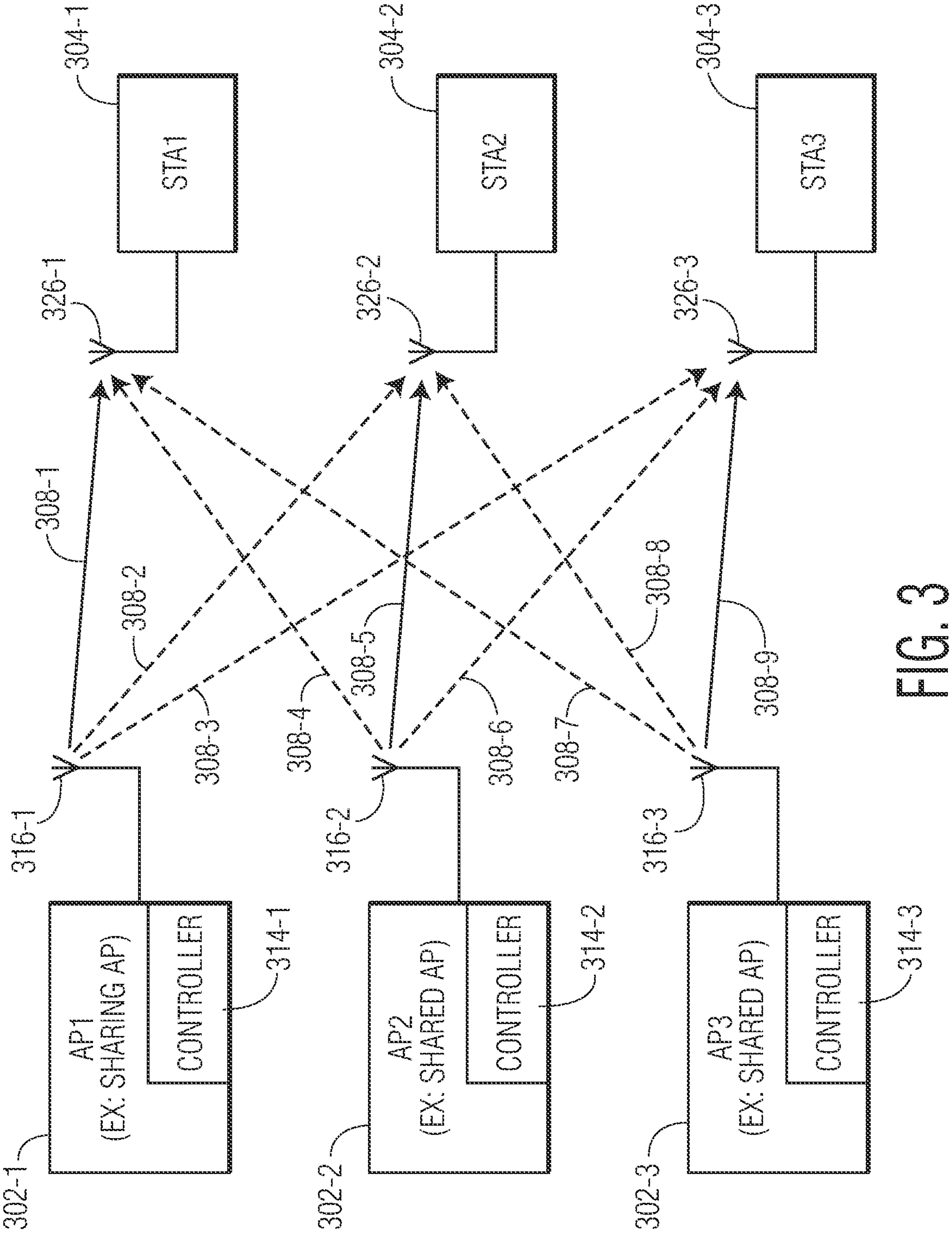
FIG. 3 depicts a multi-AP (MAP) transmission system in accordance with an embodiment of the invention.

FIG. 3 depicts a multi-AP (MAP) transmission system 300 in accordance with an embodiment of the invention. In the embodiment depicted in FIG. 3, the MAP transmission system 300 includes three APs 302-1, 302-2, 302-3 and three stations (STAs) 304-1, 304-2, 304-3. The MAP transmission system 300 can be used in various applications, such as industrial applications, medical applications, computer applications, and/or consumer or enterprise applications. In some embodiments, the MAP transmission system is compatible with an IEEE 802.11 protocol. Although the depicted MAP transmission system 300 is shown in FIG. 3 with certain components and described with certain functionality herein, other embodiments of the MAP transmission system may include fewer or more components to implement the same, less, or more functionality. For example, in some embodiments, the MAP transmission system includes more than three APs, less than three APs, more than three STAs, and/or less than three STAs. In another example, although the MAP transmission system is shown in FIG. 3 as being connected in a certain topology, the network topology of the MAP transmission system is not limited to the topology shown in FIG. 3. In some embodiments, the MAP transmission system described with reference to FIG. 3 involves single-link communications and the APs 302-1, 302-2, 302-3 and the STAs 304-1, 304-2, 304-3 communicate through single communications links. In some embodiments, the MAP transmission system described with reference to FIG. 3 involves multi-link communications and the APs 302-1, 302-2, 302-3 and the STAs 304-1, 304-2, 304-3 communicate through multiple communications links. Furthermore, the techniques described herein may also be applicable to each link of a multi-link communications system.

In the embodiment depicted in FIG. 3, each of the APs 302-1, 302-2, 302-3 may be implemented in hardware (e.g., circuits), software, firmware, or a combination thereof. Each of the APs 302-1, 302-2, 302-3 may be fully or partially implemented as an IC device. In some embodiments, at least one of the APs 302-1, 302-2, 302-3 is a wireless AP compatible with at least one WLAN communications protocol (e.g., at least one IEEE 802.11 protocol). In some embodiments, at least one of the APs 302-1, 302-2, 302-3 is a wireless AP that connects to a LAN and/or to a backbone network (e.g., the Internet) through a wired connection and that wirelessly connects to one or more wireless STAs, for example, through one or more WLAN communications protocols, such as an IEEE 802.11 protocol. In some embodiments, each of the APs 302-1, 302-2, 302-3 includes at least one antenna 316-1, 316-2, or 316-3 and at least one controller 314-1, 314-2, or 314-3. In some embodiments, each of the APs 302-1, 302-2, 302-3 (e.g., the at least one controller 314-1, 314-2, or 314-3) includes at least one transceiver, which may include a physical layer (PHY) device. The controller may be configured to process received packets through the antenna. In some embodiments, the controller is implemented within a processor, such as a microcontroller, a host processor, a host, a DSP, or a CPU. In some embodiments, at least one of the APs 302-1, 302-2, 302-3 (e.g., a controller of the AP) implements upper layer MAC functionalities (e.g., beacon acknowledgement establishment, reordering of frames, etc.) and/or lower layer MAC functionalities (e.g., backoff, frame transmission, frame reception, etc.). Although the MAP transmission system 300 is shown in FIG. 3 as including three APs, other embodiments of the MAP transmission system 300 may include more than three APs or less than three APs. In some embodiments, each of the APs 302-1, 302-2, 302-3 of the MAP transmission system 300 may operate in a different frequency band. For example, one AP may operate in one frequency band of 2.4 GHz, 5 GHz, 6 GHz, 45 GHZ, and 60 GHz frequency bands and another AP may operate in another frequency band of 2.4 GHz, 5 GHZ, 6 GHZ, 45 GHZ, and 60 GHz frequency bands.

In the embodiment depicted in FIG. 3, the STAs 304-1, 304-2, 304-3 may be implemented in hardware (e.g., circuits), software, firmware, or a combination thereof. Each of the STAs 304-1, 304-2, 304-3 may be fully or partially implemented as IC devices. In some embodiments, at least one of the STAs 304-1, 304-2, 304-3 is a communications device compatible with at least one IEEE 802.11 protocol. In some embodiments, at least one of the STAs 304-1, 304-2, 304-3 is implemented in a laptop, a desktop personal computer (PC), a mobile phone, or other communications device that supports at least one WLAN communications protocol. In some embodiments, at least one of the STAs 304-1, 304-2, 304-3 implements a common MAC data service interface and a lower layer MAC data service interface. In some embodiments, at least one of the STAs 304-3, 304-2, 304-3 includes at least one antenna 326-1, 326-2, or 326-3, at least one transceiver (not shown) operably coupled to the at least one antenna, and/or at least one controller (not shown). In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver. Although the MAP transmission system 300 is shown in FIG. 3 as including three STAs, other embodiments of the MAP transmission system 300 may include more than three STAs or less than three STAs.

In the embodiment depicted in FIG. 3, the APs 302-1, 302-2, 302-3 communicate with the STAs 304-1, 304-2, 304-3 via communication links (e.g., wireless links) 308-1, . . . , 308-9. In some embodiments, data communicated between the APs and the STAs includes MPDUs. An MPDU may include a frame header, a frame body, and a trailer with the MPDU payload encapsulated in the frame body. In some embodiments, the APs 302-1, 302-2, 302-3 may collaborate to communicate independently with the STAs 304-1, 304-2, 304-3. In some embodiments, the number of antennas at each device is two.

In some embodiments, the AP 302-1 is a sharing AP (pAP) while the APs 302-2, 302-3 are shared APs (sAPs). In some embodiments, a sharing AP (pAP) corresponds to an AP which shares the channel (or primary/Initiator AP) and a shared AP (sAP) corresponds to an AP to which the channel is shared (or secondary AP). In channel acquisition of the AP 302-1 (pAP), the AP 302-2 (sAP1), and the AP 302-3 (sAP2), the pAP may transmit a trigger physical layer protocol data unit (PPDU). The trigger PPDU may be indicative of a request for the sAP1 and the sAP2 to join the coordinated transmission for MAP-IA transmission. Further, the pAP may verify for a clear-to-send (CTS) frame from the sAP1 and the sAP2. Based on the CTS frame reception, the pAP may transmit a control packet indicative of the mode of transmission. In an embodiment, the mode of transmission may be one of a Joint transmission (JTx), a CBF, and a MAP-IA. The described modes of transmission may correspond to spatial coordination modes. In various embodiments, other modes of coordination like coordinated orthogonal frequency-division multiple access (COFDMA), and time-division multiple access (TDMA), may be used.

Figure 4:
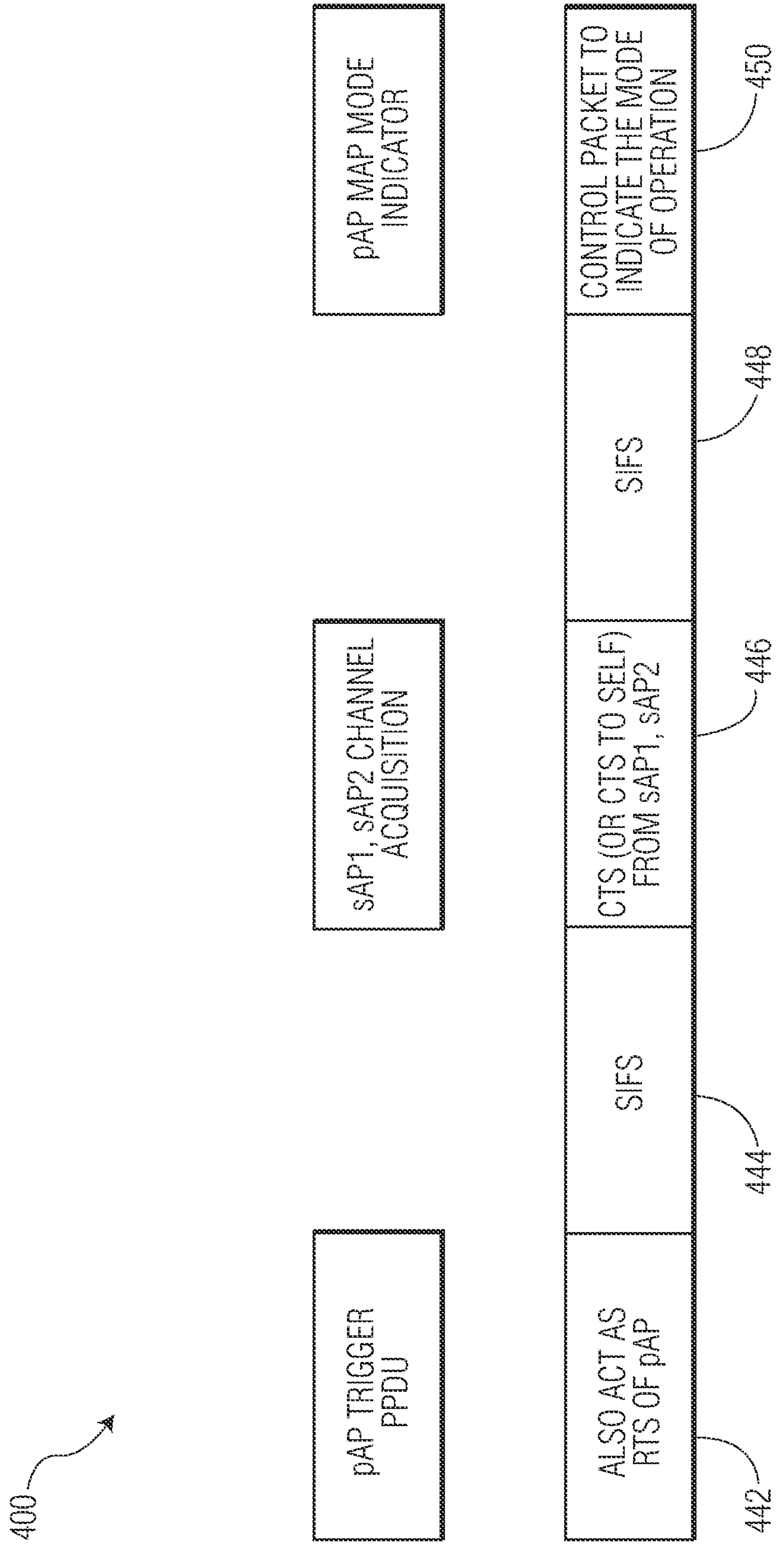
FIG. 4 illustrates a transmission frame format in accordance with an embodiment of the invention.

FIG. 4 illustrates a transmission frame format 400 in accordance with an embodiment of the invention. The transmission frame format 400 illustrated in FIG. 4 may be used by the MAP transmission system 100 depicted in FIG. 1 and/or the MAP transmission system 300 depicted in FIG. 3. As illustrated in FIG. 4, a pAP trigger PPDU is transmitted, which acts as a request to send (RTS) 442 of the pAP (e.g., the AP 302-1). A Short Interframe Space (SIFS) 444 follows the RTS 442. Corresponding to sAP1, sAP2 channel acquisition, a CTS or CTS-to-self 446 from sAP1, sAP2 (e.g., the AP 302-2 and the AP 302-3) follows the SIFS 444. An SIFS 448 follows the CTS or CTS-to-self 446. Corresponding to a pAP MAP mode indicator, a control packet 450 to indicate the mode of operation follows the SIFS 448. In an embodiment, if a response with CTC is not received from the sAP1 and the sAP2 (e.g., the AP 302-2 and the AP 302-3), a mode indicator packet may not be sent and a regular operation may be continued. If one of the sAP1 and sAP2 (e.g., the AP 302-2 and the AP 302-3) responds, the mode 10) indicator packet may be indicative of the subsequent MAP transmission being one of the JTx and the CBF. If both the sAP1 and the sAP2 (e.g., the AP 302-2 and the AP 302-3) respond, the mode indicator packet may be indicative of the subsequent MAP transmission being one of the JTx, the CBF, or MAP-IA. The JTx and the CBF may follow a set of procedures following the mode indicator packet.

Figure 5:
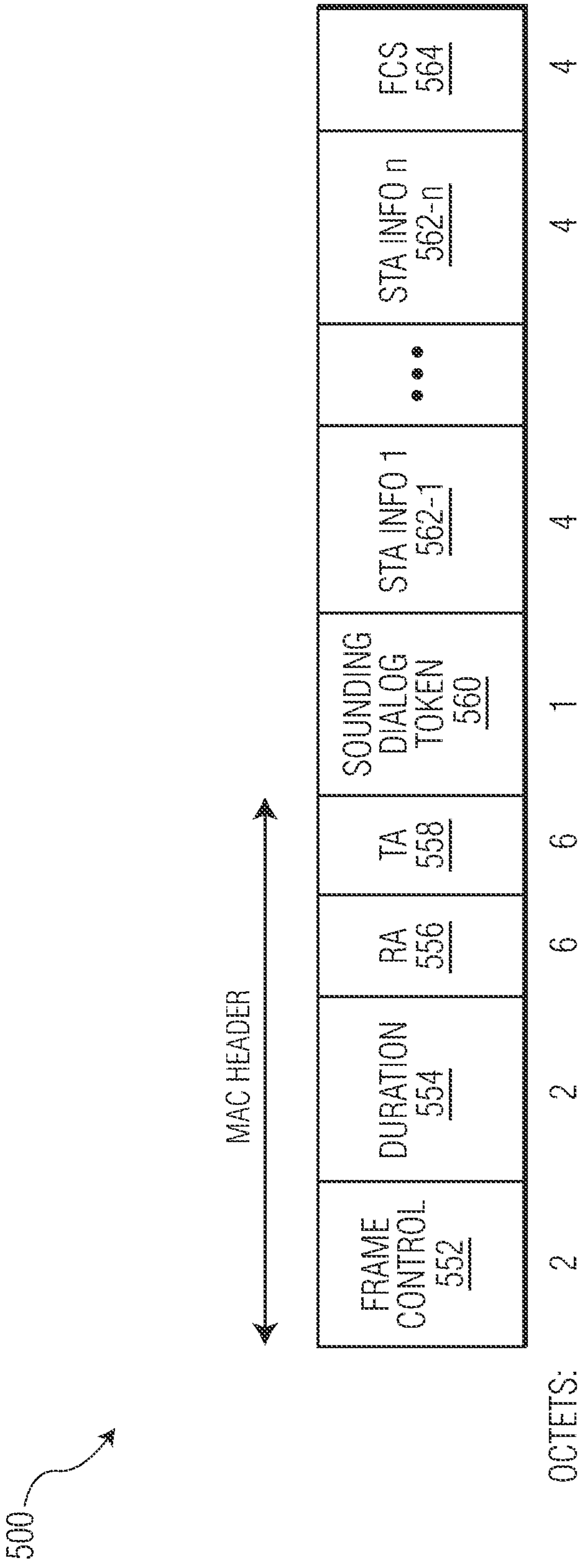
FIG. 5 illustrates a null data packet announcement (NDPA) frame format in accordance with an embodiment of the invention.

FIG. 5 illustrates a null data packet announcement (NDPA) frame format 500 in accordance with an embodiment of the invention. The NDPA frame format 500 illustrated in FIG. 5 may be used by the MAP transmission system 100 depicted in FIG. 1 and/or the MAP transmission system 300 depicted in FIG. 3. In the embodiment depicted in FIG. 5, the NDPA frame format 500 includes a MAC header that includes a frame control field 552 (e.g., two-octet) that may contain frame control information, a frame duration field 554 (e.g., two-octet) that may contain frame duration information, a RA (receiver address or broadcast address) field 556 (e.g., six-octet) that may contain receiver address information, and a TA (transmitter address) field 558 (e.g., six-octet) that may contain transmitter address information (e.g., repurpose to broadcast address of the MAP sounding procedure set of APs), a sounding dialog token field 560 (e.g., one-octet) that may contain sounding dialog token information, station (STA) information (info) fields 562-1, . . . , 562-*n*, where n is a positive integer, (e.g., four-octet) that may contain STA ID of the STA, which has sent back the feedback report, and a frame check sequence (FCS) filed 564 (e.g., four-octet) that may contain FCS information.

For independent sounding, a sequential sounding from each of the APs may be employed. The pAP (e.g., the AP 302-1) may perform a trigger-based (TB) sounding procedure to retrieve feedback from all the stations (STAs) (e.g., the STAs 304-1, 304-2, 304-3) included in the MAP-IA transmission procedure. Further, the sAP1 (e.g., the AP 302-2) may perform the TB sounding procedure to retrieve feedback from all the STAs (e.g., the STAs 304-1, 304-2, 304-3) included in the MAP-IA transmission procedure. Additionally, the sAP2 (e.g., the AP 302-3) may perform the TB sounding procedure to retrieve feedback from all the STAs included in the MAP-IA transmission procedure.

Each of the STAs (e.g., the STAs 304-1, 304-2, 304-3) may estimate the channel and broadcast the feedback report to all the APs. The feedback report may be of the dimension Ni rows and Nc columns, where Ni is the number of transmit antennas at APi and Nc is the number of sounding dimensions. Further, the feedback report may be transmitted using the TB sounding procedure, i.e., UL-OFDMA format may be used for transmitting simultaneously multiple STAs.

For Joint sounding, all the APs (e.g., the APs 302-1, 302-2, 302-3) may transmit the NDPA and the NDP simultaneously. Further, frequency and timing synchronization and pre-compensation on both the NDPA and the NDP packets are required. The sAP1 and the sAP2 (e.g., the AP 302-2 and the AP 302-3) may perform the pre-compensation as in the UL-TB PPDU pre-compensation of High-Efficiency WLAN (HEW)/Extremely High Throughput (EHT) packet format using the trigger frame used to initiate the MAP-IA transmission. The APs are ordered as [pAP, SAP1, sAP2] and may be configured to use the corresponding rows of P matrix as in UL-MUMIMO (multi-user, multiple input, multiple output) transmission.

Each of the STAs (e.g., the STAs 304-1, 304-2, 304-3) may estimate the wireless communications channel and broadcast the feedback report to all the APs (e.g., the APs 302-1, 302-2, 302-3). The feedback report may be of the dimension N1+N2+N3 rows and Nc columns, where the Ni is the number of transmit antennas at APi, and the Nc is the number of sounding dimensions. For precoder computation in a three-AP to three-STA scenario, the channel matrix feedback report may be available for all the nine links by using the sounding procedure.

The IA precoder requirement may be given by:

$$\text{rank}\left(U_j^H V_{jj} Q_j\right) = Nss_j \tag{1}$$

$$\left(\text{rank}\left(U_i^H V_{ij} Q_j\right) \forall\, i \neq j\right) = 0 \tag{2}$$

wherein, the Feedback report: $V_{ij}$—represents the feedback report from STA-i to AP-j, the precoder matrix: $Q_j$—represents the precoder used at AP-j, and the equalizer matrix: $U_i$—represents the equalizer used at STA-i.

Considering a symmetric configuration where each AP has M antennas and each client has N antennas, the total number of streams (Nss) that may be transmitted from 3 APs to 3 STAs is given by:

$$\sum_{j=1}^{3} Nss_j = \min\left(\left\lfloor 3 \times \frac{M+N}{4} \right\rfloor,\ 3 \times \min(M,\ N)\right) \tag{3}$$

As per the literature, there are some infeasible cases for IA.

FIG. 6 illustrates a tabular representation 600 of precoder (e.g., precoding vector) computation in accordance with an embodiment of the invention. The tabular representation 600 of precoder computation illustrated in FIG. 6 may be used by the MAP transmission system 100 depicted in FIG. 1 and/or the MAP transmission system 300 depicted in FIG. 3. In the tabular representation 600 illustrated in FIG. 6, M represents the number of antennas of each transmitter/AP, N represents the number of antennas of each receiver/station (STA) or client, $$\sum_{j=1}^{3} Nss_j$$

represents the total number of streams (Nss) that may be transmitted from 3 APs/transmitters, Nss represents the number of streams that may be transmitted from a transmitter/AP, and precoder represents precoding vector. The precoders (e.g., precoding vectors) of the form $$Q'_j = Q_j \times A_j$$

for any arbitrary $A_j$ may falls under the IA precoders. $A_j$ may be optimized for improved performance. The APs may be ordered in the group and may be configured to transmit the Long training fields (LTFs) in a fixed location. The number of the LTF ($N_{LTF}$) may be a function of the total number of streams across all the APs.

$N_{LTF,\ initial}=f(\Sigma_i Nss_i)$, and the mapping ($f(.)$) complies with the WLAN standard for other packet formats. To improve channel estimation, additional LTF may be transmitted, such that, $N_{LTF} \geq N_{LTF,\ initial}$. $N_{LTF}$ Should comply with the allowed possible number of LTFs. For example, $N_{LTF}=3$ is not allowed.

The LTF structure may include the LTF loading and processing at both the transmitter and receiver. Further, the LTF structure may follow the UL-MUMIMO procedure for the LTF. It may use one of a single stream pilot and a masked pilot. Additionally, different sets of tones defined as pilot tones for the APs may be used as orthogonal pilots.

$K_{pi} \in \mathcal{K}_{pi}$, $|K_{pi}|=N_{pi}$ where $K_{pi}$—Pilot tone index, $\mathcal{K}_{pi}$—set defining the possible pilot tone indices, $N_{pi}$—total number of the pilot tones.

In a pilot tone index $K_{pi}$, only APi transmits the pilot with the R matrix while all other APs will not load that index.

$\mathcal{K}_{p1}$—can represent the pilot indices as defined for the signal user (SU)/OFDMA transmission for the given resource unit (RU), $\mathcal{K}_{p2}=\mathcal{K}_{p1}+4$, $\mathcal{K}_{p3}=\mathcal{K}_{p1}-4$, where ±4 implies ±4 is applied on all the tones of the set $\mathcal{K}_{p1}$, where, ±4, could be any $x_2$ and $x_3$.

Though not mentioned, the loaded tone set may still comply with all the mask requirements and the number of non-zero tones defined for the corresponding RU. The pilot tones may not be loaded outside the RU defined.

The pilots may use a spatial expansion matrix as a linear combination of the corresponding AP-STA precoder matrix, i.e., $Q_{i,p}=Q_i \times a_{Nss_i \times 1}$, where $a_{Nss_i \times 1}$ is an arbitrary vector.

In the data portion, the pilots may have the signal from all the APs. In an embodiment, when the LTF structure is the UL-MUMIMO format with the single stream pilot, there may be no Common Phase Error (CPE) compensation at the LTF portion. Further, in the data portion, the pilots may be equalized to remove the effect from the other APs and the CPE is estimated and compensated. Further, when the LTF structure is the Masked LTF, no CPE compensation at the LTF portion is provided. In the data portion, the pilots are also equalized to remove the effect from the other APs and CPE is estimated and compensated. In another embodiment, the LTF structure is the orthogonal pilots. As the pilots are not interfering from different APs in an LTF location, the LTF portion may be configured to perform CPE compensation. In the data portion, the pilots may be equalized to remove the effect from the other APs and CPE is estimated and compensated. As the pilots may be a single stream, the equalization may be with respect to the corresponding channel estimates.

The IA solution may be implemented for a dual network. In the dual network, the transmitters and the receivers in the data packet transmission may change their respective roles. In this case, a STA may transmit and an AP may receive. In the dual network, the zero forcing (ZF) equalizer may be used for decoding at the STA and will become the precoder when the STA is transmitting an acknowledgement (Ack) packet. During data transmission, if the received signal is $$y_i = H_{ii}Q_i x_i + \sum_{j=1,j\neq i}^{3} H_{ij}Q_j x_j + n_i,$$

the ZF estimate at the receiver is given by $$z_i = W_i^H y_i, \text{ where } W_i - N \times Nss_i \text{ such that } W_i^H H_{ij,j\neq i} = 0.$$

The STA may be transmitting the Ack packet. In such a scenario, the equalizer matrix $W_i$ may become the precoder matrix which may satisfy the IA condition and forms the MAP-IA transmission. Because of the difference in filters between the transmitter path and the receiver path, a calibration process is required. Independent device calibration which will be used for implicit beamforming (BF) is required while using $W_i$ as the precoder. The computed precoder can be post-multiplied with the arbitrary matrix for per-user performance optimization.

In feedback reduction, the precoders satisfying IA requirement are sensitive to channel variation. With channel aging, i.e., channel variation over time the same set of precoders will cause significant degradation. In such a scenario, the sounding procedure is needed frequently to maintain the IA requirement. The frequent requirement of the sounding procedure will reduce the overall system throughput gain available. The dual network solution used in the Ack packet transmission can be re-used in subsequent data packet transmission.

The Ack packet received at the AP is of the form:

$$y_i = H_{ii}^H W_i x_i + \sum_{j=1,j\neq i}^{3} H_{ji}^H W_j x_j + n_i$$

The ZF equalizer ($Q_i$) will be such that $$Q_i^H H_{ji,j\neq i}^H = 0$$

The ZF equalizer with device calibration adjustment will form the precoders to be used for MAP-IA transmission.

The above procedure can be followed in both uplink (UL) and downlink (DL) packets removing the requirement of sounding procedure completely except for the initial pre-coder formation. The acknowledgement (Ack) packet may always be sent as a multi-stream channel packet. The LTF portion may follow the structure same as transmitting $Nss_i$ streams. The ack data may be generated for $Nss_i$ streams or it may be generated for one stream and repeated across all other streams. This may be a pre-defined process and the receiver may be aware of the required processing to decode the Ack packets. The duality may also be applicable to the CBF transmission. The same procedure may be adopted for the CBF transmission, i.e., the calibrated adjusted equalizer matrix may be used as the precoder in the subsequent transmission.

Thus, better use of the spectrum on top of CBF may be achieved using the technique of IA. IA allows significant performance improvement on top of resource sharing (e.g., CBF/COFDMA) and may become one of the key features in Wi-fi 8.

The present disclosure discloses channel acquisition and sounding procedure. In the sounding procedure, the definition is repurposed for TA and RA. The present disclosure further discloses the LTF definition and pilot definition in the data portion with CPE operation at the receiver. The present disclosure discloses acknowledgment packet transmission using the dual network using calibration adjustment to convert the equalization matrix into the precoder matrix and feedback reduction using the dual network concept in both MAP-IA and CBF transmission and requirement in Ack packet transmission. For any configurations of MAP-IA and CBF transmission, all the above processes can be leveraged and claimed.

The example provided so far is for M transmit antenna and N receiver antenna with 3 users. The scope of the present disclosure also covers the general system with K user, Mi transmitter antenna, and Nj receiver antenna.

Figure 7:
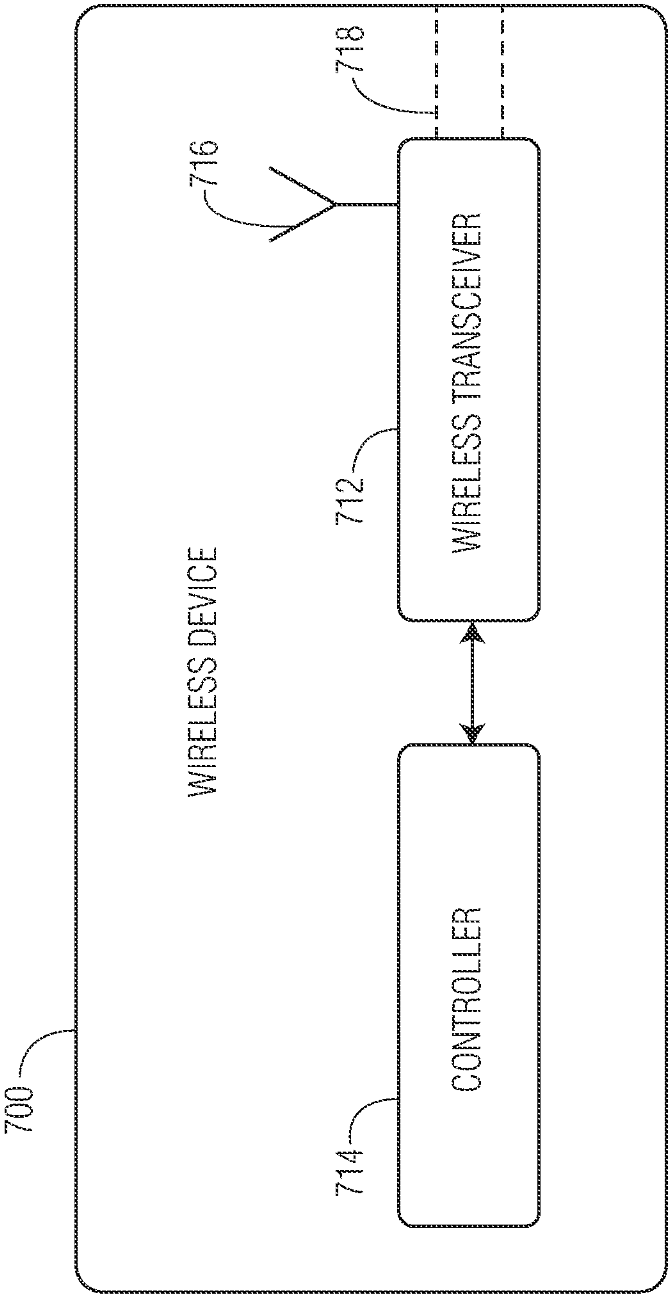
FIG. 7 depicts a wireless device in accordance with an embodiment of the invention.

FIG. 7 depicts a wireless device 700 in accordance with an embodiment of the invention. The wireless device 700 may be an embodiment of the APs 102-1, 102-2, 102-3 and/or the STAs 104-1, 104-2, 104-3 depicted in FIG. 1 and/or the APs 302-1, 302-2, 302-3 and/or the STAs 304-1, 304-2, 304-3 depicted in FIG. 3. In the embodiment depicted in FIG. 7, the wireless device 700 includes a wireless transceiver 712, a controller 714 operably coupled to the wireless transceiver, and at least one antenna 716 operably coupled to the wireless transceiver. In some embodiments, the wireless device 700 may include at least one optional network port 718 operably coupled to the wireless transceiver. In some embodiments, the wireless transceiver includes a physical layer (PHY) device. The wireless transceiver may be any suitable type of wireless transceiver. For example, the wireless transceiver may be a wireless local area network (WLAN) transceiver (e.g., a transceiver compatible with an IEEE 802.11 protocol). In some embodiments, the wireless device 700 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. The wireless device 3300 may be compatible with an IEEE 802.11 protocol.

In accordance with an embodiment of the invention, the controller 714 is configured to generate a trigger packet indicating that wireless access points (APs) can join coordinated transmission with the wireless device 700 (e.g., a request for the wireless APs to join the coordinated transmission with the wireless device 700), and the wireless transceiver 712 is configured to transmit the trigger packet to the wireless APs. In some embodiments, the wireless device includes a wireless AP. In some embodiments, the wireless transceiver is further configured to receive a response from the wireless APs, and the controller is further configured to generate a control packet to indicate a mode of transmission based on the response from the wireless APs to the trigger packet. In some embodiments, the trigger packet includes a trigger physical layer protocol data unit (PPDU). In some embodiments, the response from the wireless APs includes a clear-to-send (CTS) packet. In some embodiments, the wireless transceiver is further configured to receive a CTS packet from one of the wireless APs, and the controller is further configured to generate a control packet to indicate a Joint transmission (JTx) mode or a Co-ordinated Beamforming (CBF) mode based on the CTS packet. In some embodiments, the wireless transceiver is further configured to receive a CTS packet from each of the wireless APs, and the controller is further configured to generate a control packet to indicate a JTx mode, a CBF mode, or a multi-AP transmission with interference alignment (MAP-IA) mode based on the CTS packets. In some embodiments, a sequential sounding procedure is performed by the wireless device and the wireless APs independently to obtain feedback from stations (STAs). In some embodiments, a joint sounding procedure is performed by the wireless device and the wireless APs to obtain feedback from STAs. In some embodiments, null data packet announcement (NDPA) frames and null data packets are transmitted simultaneously by the wireless device and the wireless APs to obtain channel estimation feedback reports from STAs. In some embodiments, the controller is further configured to compute a precoding vector based on the channel estimation feedback reports. In some embodiments, the wireless transceiver is further configured to transmit Long training fields (LTFs), and a number of the LTFs is a function of a total number of streams across the wireless device and the wireless APs. In some embodiments, at least one pilot is equalized at the STAs. In some embodiments, the wireless transceiver is further configured to transmit an acknowledgement packet as a multi-stream channel packet. In some embodiments, no response is received at the wireless transceiver from the wireless APs, and the controller is further configured to continue to operate the wireless device under a regular operational mode. In some embodiments, the wireless device is compatible with an IEEE 802.11 protocol.

Figure 8:
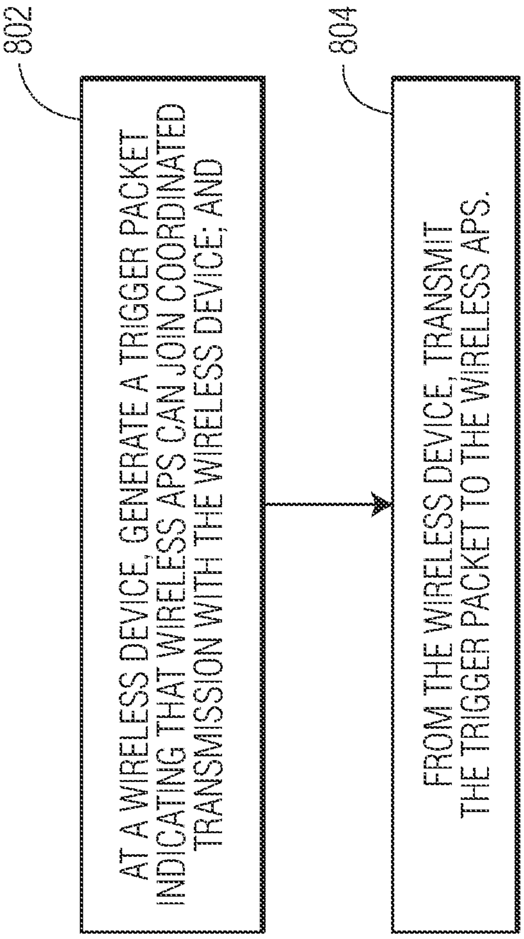
FIG. 8 is a process flow diagram of a method for wireless communications in accordance with an embodiment of the invention.

FIG. 8 is a process flow diagram of a method for wireless communications in accordance with an embodiment of the invention. At block 802, at a wireless device, a trigger packet indicating that wireless access points (APs) can join coordinated transmission with the wireless device (e.g., a request for the wireless APs to join the coordinated transmission with the wireless device) is generated. At block 804, from the wireless device, the trigger packet is transmitted to the wireless APs. In some embodiments, the wireless device and the wireless APs are compatible with an Institute of Electrical and Electronics Engineers (IEEE) 802.11 protocol. In some embodiments, the wireless device includes a wireless AP. In some embodiments, at the wireless device, a response is received from the wireless APs, and at the wireless device, a control packet is generated to indicate a mode of transmission based on the response from the wireless APs to the trigger packet. In some embodiments, the trigger packet includes a trigger PPDU. In some embodiments, the response from the wireless APs includes a CTS packet. In some embodiments, at the wireless device, a CTS packet is received from one of the wireless APs, and at the wireless device, a control packet is generated to indicate a Joint transmission (JTx) mode or a Co-ordinated Beamforming (CBF) mode based on the CTS packet. In some embodiments, at the wireless device, a CTS packet is received from each of the wireless APs, and at the wireless device, a control packet is generated to indicate a JTx mode, a CBF mode, or a multi-AP transmission with interference alignment (MAP-IA) mode based on the CTS packets. In some embodiments, a sequential sounding procedure is performed by the wireless device and the wireless APs independently to obtain feedback from a stations (STAs). In some embodiments, a joint sounding procedure is performed by the wireless device and the wireless APs to obtain feedback from STAs. In some embodiments, a receiver address (RA) field and a transmitter address (TA) field of a plurality of null data packet announcement (NDPA) frames are repurposed to carry a broadcast address of a MAP sounding procedure set of the wireless APs. In some embodiments, NDPA frames and null data packets are transmitted simultaneously by the wireless device and the wireless APs to obtain channel estimation feedback reports from STAs. In some embodiments, at the wireless device, a precoding vector is computed based on the channel estimation feedback reports. In some embodiments, from the wireless device, Long training fields (LTFs) are transmitted and a number of the LTFs is a function of a total number of streams across the wireless device and the wireless APs. In some embodiments, a set of tones used for pilot tones are orthogonal across the wireless APs. In some embodiments, only one wireless AP of the wireless APs loads the pilot tones on its set of pilot tones while other wireless APs of the wireless APs do not load those set of pilot tones. In some embodiments, at least one pilot is equalized at the STAs. In some embodiments, from the wireless device, an acknowledgement packet is transmitted as a multi-stream channel packet. In some embodiments, the wireless transceiver is further configured to repeat single stream data in multi-stream transmission. In some embodiments, the acknowledgement packet is precoded with a Hermitian of a calibrated adjusted equalizer matrix computed in a previously received packet. In some embodiments, the wireless transceiver is further configured to, on receiving the acknowledgement packet, compute the calibrated adjusted equalizer matrix and use the Hermitian of the calibrated adjusted equalizer matrix as a precoder for subsequent transmission. In some embodiments, no response is received at the wireless transceiver from the wireless APs, and the wireless device continues to operate under a regular operational mode. The wireless device may be the same as or similar to the APs 102-1, 102-2, 102-3 and/or the STAs 104-1, 104-2, 104-3 depicted in FIG. 1 and/or the APs 302-1, 302-2, 302-3 and/or the STAs 304-1, 304-2, 304-3 depicted in FIG. 3. The wireless APs may be the same as or similar to the APs 102-1, 102-2, 102-3 depicted in FIG. 1 and/or the APs 302-1, 302-2, 302-3 depicted in FIG. 3.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless device comprising:

a controller configured to generate a trigger packet indicating that a plurality of wireless access points (APs) can join coordinated transmission with the wireless device; and a wireless transceiver configured to transmit the trigger packet to the wireless APs, wherein a plurality of null data packet announcement (NDPA) frames and a plurality of null data packets are transmitted simultaneously by the wireless device and the wireless APs to obtain a plurality of channel estimation feedback reports from a plurality of stations (STAs), and wherein the controller is further configured to compute a precoding vector based on the channel estimation feedback reports.

2. The wireless device of claim 1, wherein the wireless device comprises a wireless AP.

3. The wireless device of claim 1, wherein the wireless transceiver is further configured to receive a response from the wireless APs, and wherein the controller is further configured to generate a control packet to indicate a mode of transmission based on the response from the wireless APs to the trigger packet.

4. The wireless device of claim 3, wherein the trigger packet comprises a trigger physical layer protocol data unit (PPDU).

5. The wireless device of claim 4, wherein the response from the wireless APs comprises a clear-to-send (CTS) packet.

6. The wireless device of claim 1, wherein the wireless transceiver is further configured to receive a clear-to-send (CTS) packet from one of the wireless APs, and wherein the controller is further configured to generate a control packet to indicate a Joint transmission (JTx) mode or a Co-ordinated Beamforming (CBF) mode based on the CTS packet.

7. The wireless device of claim 1, wherein the wireless transceiver is further configured to receive a clear-to-send (CTS) packet from each of the wireless APs, and wherein the controller is further configured to generate a control packet to indicate a Joint transmission (JTx) mode, a Co-ordinated Beamforming (CBF) mode, or a multi-AP transmission with interference alignment (MAP-IA) mode based on the CTS packets.

8. The wireless device of claim 3, wherein a receiver address (RA) field and a transmitter address (TA) field of a plurality of null data packet announcement (NDPA) frames are repurposed to carry a broadcast address of a MAP sounding procedure set of the wireless APs.

9. The wireless device of claim 1, wherein the wireless transceiver is further configured to transmit a plurality of Long training fields (LTFs), and wherein a number of the LTFs is a function of a total number of streams across the wireless device and the wireless APs.

10. The wireless device of claim 9, where a set of tones used for pilot tones are orthogonal across the wireless APs.

11. The wireless device of claim 10, wherein at least one pilot is equalized at the STAs, and wherein only one wireless AP of the wireless APs loads the pilot tones on its set of pilot tones while other wireless APs of the wireless APs do not load those set of pilot tones.

12. The wireless device of claim 10, wherein the wireless transceiver is further configured to transmit an acknowledgement packet as a multi-stream channel packet.

13. The wireless device of claim 12, wherein the wireless transceiver is further configured to repeat single stream data in multi-stream transmission.

14. The wireless device of claim 12, wherein the acknowledgement packet is precoded with a Hermitian of a calibrated adjusted equalizer matrix computed in a previously received packet.

15. The wireless device of claim 14, wherein the wireless transceiver is further configured to, on receiving the acknowledgement packet, compute the calibrated adjusted equalizer matrix and use the Hermitian of the calibrated adjusted equalizer matrix as a precoder for subsequent transmission.

16. The wireless device of claim 1, wherein no response is received at the wireless transceiver from the wireless APs, and wherein the controller is further configured to continue to operate the wireless device under a regular operational mode.

17. A wireless access point (AP) compatible with an Institute of Electrical and Electronics Engineers (IEEE) 802.11 protocol, the wireless AP comprising:

a controller configured to generate a trigger packet indicating that a plurality of wireless APs can join coordinated transmission with the wireless AP; and a wireless transceiver configured to transmit the trigger packet to the wireless APs and to receive a response from the wireless APs, and wherein the controller is further configured to generate a control packet to indicate a mode of transmission based on the response from the wireless APs to the trigger packet, wherein a plurality of null data packet announcement (NDPA) frames and a plurality of null data packets are transmitted simultaneously by the wireless AP and the wireless APs to obtain a plurality of channel estimation feedback reports from a plurality of stations (STAs), and wherein the controller is further configured to compute a precoding vector based on the channel estimation feedback reports.

18. A method for wireless communications, the method comprising:

at a wireless device, generating a trigger packet indicating that a plurality of wireless access points (APs) can join coordinated transmission with the wireless device; and from the wireless device, transmitting the trigger packet to the wireless APs, wherein a plurality of null data packet announcement (NDPA) frames and a plurality of null data packets are transmitted simultaneously by the wireless device and the wireless APs to obtain a plurality of channel estimation feedback reports from a plurality of stations (STAs), and wherein the method further comprises computing a precoding vector based on the channel estimation feedback reports.

* * * * *